Patented Oct. 10, 1950

2,524,812

UNITED STATES PATENT OFFICE 2,524,812

PLASTICIZED ETHYL CELLULOSE

Earle L. Kropscott and Paul H. Lipke, Jr., Midland, Mich., assignors to The Dow Chemical Company, Midland, Mich., a corporation of Delaware No Drawing. Application June 4, 1947, Serial No. 752,566

2 Claims. (Cl. 106—188)

This invention relates to a specific composition of plasticized ethyl cellulose for use in making barrels for fountain pens.

Among the problems arising as a result of the modern trend in fountain pen construction is that of finding a material from which the barrel may be made. Since rubber ink-sacs are no longer used, the barrel must be able to withstand continuous contact with ink which may be either acid or alkaline in character. The intricate feed mechanism being built into modern pens requires a greater degree of accuracy as to various dimensions than has been deemed necessary in the past. To provide this accuracy, it is becoming the practice to drill and turn the barrels from a solid blank on a drill press or screw machine and lathe, in much the same way that accurate machine parts are made from metal. This imposes a necessity for the plastic composition of which the barrel is made to be tough and non-brittle, so as to be easily machined, and to have dimensional stability over the range of temperatures encountered, as well as good strength and a suitable measure of surface hardness (at least 2H, Venus pencil series) to withstand possible rough treatment without breaking or developing unsightly surface blemishes.

It is an object of this invention to provide an ethyl cellulose composition having the above-stated desired combination of properties, and suitable for use in making fountain pen barrels. A related object is to provide a pen barrel having the desired properties.

It has been found that a composition consisting essentially of from 92 to 98 per cent by weight of ethyl cellulose having an ethoxyl content of from 45 to 46 per cent and a viscosity in the range from 60 to 100 centipoises, and complementarily from 2 to 8 per cent by weight of tri-tertiary-octyl diphenyloxide, has the desired combination of properties, as will be shown more fully hereinafter. The composition may contain, as well, a pigment to provide the desired shade of color and degree of opacity, and it may contain a stabilizer to protect the composition from darkening during extrusion of the blank from which the pen barrel is machined. Suitable pigments are well known in the art, as are various stabilizers for the stated purpose. Examples of stabilizers are p,p'-dimethoxy diphenylamine and p-tertiary-butyl catechol.

Whenever the viscosity type of the ethyl cellulose employed is mentioned herein in terms of centipoises, the measurement was made on a 5 per cent solution of the ethyl cellulose, by weight, in a 70:30 mixture of toluene and ethanol, by volume.

The tri-tertiary-octyl diphenyloxide may be prepared by a condensation of di-isobutylene with diphenyloxide (phenyl ether) in the presence of a Friedel-Crafts catalyst such as aluminum chloride, and fractional distillation of the resulting product. The tri-octyl compound, or mixture of isomeric compounds, here employed as a plasticizer, boils between 250° and 270° C. at 3 millimeters of mercury, absolute pressure. It has a refractive index of about 1.516 at 25° C., referred to the D line of sodium, and has a viscosity of at least 40,000 centistokes at 25° C. It loses less than 5 per cent by volatility when a layer of the plasticizer, 0.1 inch thick, is heated in air for 100 hours at 100° C.

The following example illustrates the compositions of the present invention:

A composition was prepared, consisting of:

| | Parts by weight |
|---|---|
| Ethyl cellulose, 45.5 per cent ethoxyl, 80 centipoises | 94 |
| Tri-tertiary-octyl diphenyloxide | 5 |
| Stabilizer | 1 |
| Pigment | 1 |

The composition was extruded in the form of a rod, 0.5 inch in diameter, from a standard extrusion machine. The extruded rod had the following physical properties:

| | |
|---|---|
| ASTM flow temperature °C | 163 |
| Heat distortion temperature °C | 94 |
| Tensile strength, pounds per square inch | 7,000 |
| Elongation, per cent, to break | 6 |
| Impact strength, foot pounds per inch of notch at 25° C | 1.3 |
| Impact strength, foot pounds per inch of notch at −18° C | 1.1 |
| Hardness: | |
|   Rockwell, M(¼ inch ball, 10 kg.–100 kg.) | 85 |
|   Venus pencil test | 3H |
| Water absorption, per cent gain after 24 hours immersion | 1.7 |

The rod was cut to the desired length and was drilled and turned to provide the required internal bore and external contour, using automatic machine tools. The machining operation proceeded smoothly and provided smooth surfaces, accurately dimensioned. The resulting barrel was polished to provide a smooth finish, and was assembled with the feed and filler mechanisms to form a finished fountain pen.

The compositions of the present invention are not affected by any of the writing inks now available, and any ink which may be used with the particular pen mechanism will not injure the barrel.

When other and better known plasticizers have been used with ethyl cellulose in attempts to produce compositions equivalent to those of this invention, and when various resins have been added to ethyl cellulose to provide the required hardness, the extruded barrel blanks have been too brittle to be machined properly, or to withstand that type of rough usage to which a pen may be subjected. Thus, hardness has usually been obtained at the expense of toughness and "machinability." The new compositions, however, are strong, tough, readily machined, have excellent dimensional stability over a wide temperature range and under stress, and are unaffected by writing fluids.

We claim:

1. A composition of matter for making fountain pen barrels, consisting essentially of from 92 to 98 parts by weight of ethyl cellulose having an ethoxyl content of from 45 to 46 per cent and a viscosity rating of from 60 to 100 centipoises, and from 2 to 8 parts by weight of tri-tertiary-octyl diphenyloxide boiling at 250° to 270° C. at 3 millimeters of mercury, absolute pressure.

2. A composition of matter for making fountain pen barrels, consisting essentially of about 94 parts by weight of ethyl cellulose having an ethoxyl content of about 45.5 per cent and a viscosity rating of about 80 centipoises, and about 5 parts by weight of tri-tertiary-octyl diphenyloxide boiling at 250° to 270° C. at 3 millimeters of mercury, absolute pressure.

EARLE L. KROPSCOTT.
PAUL H. LIPKE, Jr.

REFERENCES CITED

The following references are of record in the file of this patent:

UNITED STATES PATENTS

| Number | Name | Date |
|---|---|---|
| 1,320,935 | Boeuf | May 6, 1919 |
| 2,109,514 | Van Duzee | Mar. 1, 1938 |
| 2,121,723 | Bass et al. | June 21, 1938 |
| 2,170,809 | Coleman et al. | Aug. 19, 1939 |

OTHER REFERENCES

"Ethyl Cellulose," Hercules (1944), page 15.

"Plastics Catalog," 1945. Published in Plastic Catalogue Corp., 122 East 42nd Street, New York 17, New York, page 154.